May 28, 1963     M. V. MARRA ETAL     3,091,339

FOOD CLEANER TYPE STRAINER PAN

Filed Oct. 19, 1959

INVENTORS
Maria V. Marra &
Lucian DeBonis

BY *L. S. Saulsbury*

ATTORNEY

United States Patent Office 3,091,339
Patented May 28, 1963

3,091,339
FOOD CLEANER TYPE STRAINER PAN
Maria V. Marra, 8011 18th Ave., and Lucian De Bonis, 8791 19th Ave., both of Brooklyn, N.Y.
Filed Oct. 19, 1959, Ser. No. 847,394
1 Claim. (Cl. 210—232)

This invention relates to a food cleaner type strainer pan.

It is the principal object of the present invention to provide a food cleaner type strainer pan that can be used in the sink for cutting, cleaning and preparing fish and meats, and vegetables in which the clean off parts and waste material will be collected in a colander that is removable from the pan for delivery to a garbage disposal and without the sink becoming clogged therewith.

It is another object of the invention to provide a food cleaner type strainer pan that is formed of an assemblage of parts that can be assembled upon one another to make the strainer pan and which can be readily disassembled for the purposes of being stored, the parts consist generally of a pan, detachable legs for the pan, a colander, a grill and a drain valve.

It is still another object of the invention to provide in a food cleaner type strainer pan, a removable colander in the pan for collecting the clean off parts and waste material and in connection therewith a drain valve rotatable between drain and plug positions in the top of the colander so that the colander can be blocked off to allow food to soak in the pan.

Other objects of the invention are to provide a food cleaner type strainer pan assembly, having the above objects in mind, which is of simple construction, has a minimum number of parts, easy to assemble, inexpensive to manufacture, compact, of pleasing appearance, durable, effective and efficient in use.

Figure 1:
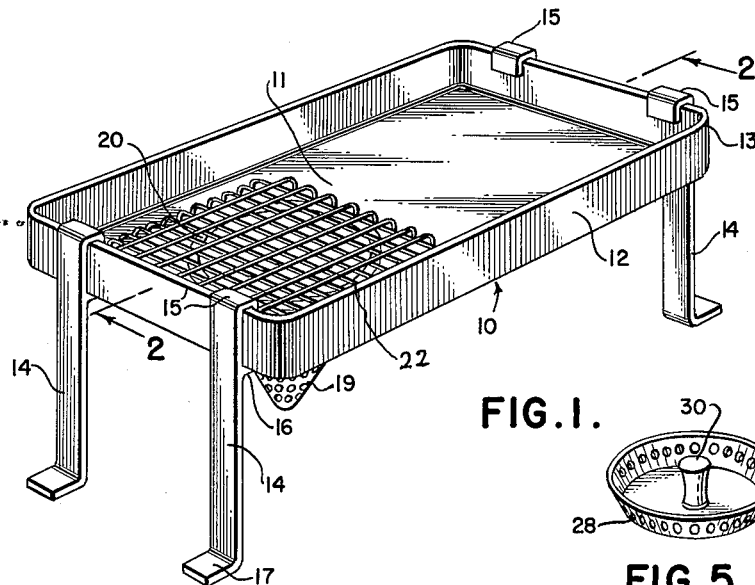
Figure 5:
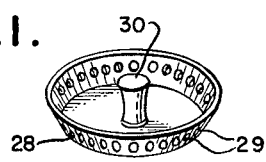
Figure 2:
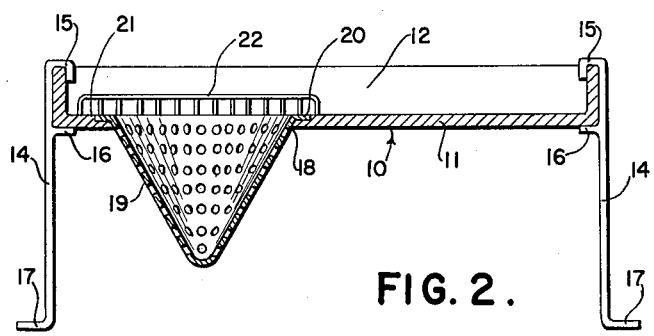
Figures 3, 4:
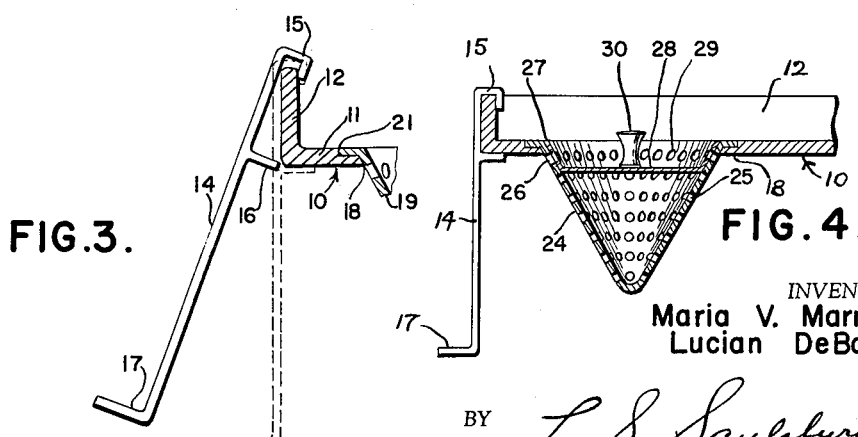

For a better understanding of the invention, reference may be had to the following detailed description taken in connection with the accompanying drawing, in which FIGURE 1 is a perspective view of the food cleaner type strainer pan assembled and ready for use, FIG. 2 is a longitudinal sectional view of the food strainer pan as viewed on line 2—2 of FIG. 1, FIG. 3 is an enlarged fragmentary sectional view taken similarly to FIG. 2, and illustrating the manner in which the detachable legs are secured to the pan side to support the same, FIG. 4 is a fragmentary longitudinal sectional view of the strainer pan with the strainer plug inserted in the colander in place of the grill, and FIG. 5 is a perspective view of the colander strainer plug.

Referring now particularly to FIGS. 1 to 3, 10 represents a pan or basin formed of metal or plastic of any suitable color and which has a bottom 11 and a side wall 12 extending therearound. This pan is rectangular in shape and the corners are rounded as indicated at 13. The side wall 12 extends straight upwardly from the bottom 11 and is adapted to receive detachable legs 14 that also may be formed of metal or plastic. Each of these legs have a hook on its upper end as indicated at 15 adapted to fit over the side wall 12 and a bottom lug projection 16 that seats under the bottom 11 of the pan to support the pan, the hook serving to prevent the lateral displacement of the leg 14 from the side wall. The lower end of the leg is turned out to provide a foot portion 17. These legs 14 are assembled upon the pan in the manner as illustrated in FIG. 3 by first locating the hook portion 15 over the upper edge of the wall 12 of the pan 10 and then locating the lug projection 16 under the bottom 11 of the pan, the leg 14 then being moved inwardly from the full line position to the dotted line position to support the pan in an elevated position in a sink.

In the bottom of the pan at one end thereof is a large hole or opening 18 for receiving a tapered colander 19 having a top supporting flange 20 that enters a countersunk recess 21 of the bottom of the pan. The colander collects the waste or disposal parts that have been removed from the meat, fowl, fish or vegetables being worked upon in the pan 10. Cleaning water drains from the colander leaving the waste therein. In order to provide additional working surface for supporting the meat, fowl, fish or vegetables and to prevent the same from getting into the colander with the waste, there is provided a grill 22 that is supported upon the bottom 10 over the colander. The grill can be lifted from the pan when the colander is to be removed.

Referring now particularly to FIGS. 4 and 5, a colander 24 is used having small openings 25 in the bottom and a ring of large openings 26 at the top. The colander 24 is supported by a flange 27 in the opening 18 in the pan 11 in the same manner that the colander 19 is supported. A strainer plug 28 conforming to the shape of the upper part of the colander is fitted therein and has holes 27 that can be aligned with the large holes 26 in the top of the colander so that the rinse water can readily pass through the plug and the colander. By grasping a central upstanding handle 30 and turning the plug, the holes are opened to allow the water to pass therethrough. When the waste matter or disposal parts are to be collected in the colander, the plug 28 is lifted out of the colander by the handle 30 until this waste matter has been disposed thereinto. The colander 24 can be removed from the pan 11 in the same manner that the colander 19 has been removed in order to empty the disposal parts. By replacing the colander and plug with the holes 29 out of alignment with the holes 26 of the colander, water can be collected in the pan in order to soak the food item therein.

It will be seen that with easy assembly of the parts a food cleaner type strainer pan adapted to be supported in sinks is provided to cut clean food and on which the disposal parts of the food can be readily collected in the colander away from the sink drain so as not to clog the same. The grill 22 prevents the edibles from falling into the colander and the colander enables the run off of the rinse water without clogging the sink. When the assembly is to be put away the legs can be readily disassembled therefrom to consume little space and the colander removed. The assembly can be placed under the sink spigot so that a continual flow of water can be run over the food and with the plug 28 adjusted to allow only a small amount of the water to pass off a collection of the clean water can be kept in the pan.

While various changes may be made in the detailed construction, it shall be understood that such changes shall be within the spirit and scope of the present invention as defined in the appended claim.

What is claimed is:

A food cleaner type strainer pan comprising a pan having a bottom and an upwardly-extending side wall, legs detachably connected to the side wall and bottom of the pan at the opposite sides thereof to support the pan above a sink surface, said pan bottom having an enlarged opening therein, a tapered colander removably supported in said opening and depending from the bottom of the pan a distance less than the length of said legs, said colander having circumferentially-spaced openings extending about the top thereof, a strainer plug having a closed bottom and a side wall tapered to fit the upper end of the colander, said plug side wall having circumferentially-spaced openings so positioned as to be aligned with said colander openings, said strainer plug when placed in the colander with openings out of alignment with said colander top openings causes water to be retained in the pan for soaking the food and when openings of the strainer plug are put in alignment with said colander top openings permits the rinse water to be drained off, said plug being removable from the colander to permit the waste to be passed into the colander to be retained therein.

References Cited in the file of this patent
UNITED STATES PATENTS

| | | |
|---|---|---|
| 477,137 | Mesick | June 14, 1892 |
| 596,763 | Stretch | Jan. 4, 1898 |
| 1,115,016 | Pheils | Oct. 27, 1914 |
| 1,116,913 | Peregoy | Nov. 10, 1914 |
| 1,461,317 | Lebleson | July 10, 1923 |
| 1,518,972 | Eckert | Dec. 9, 1924 |
| 2,166,273 | Ulmer | July 18, 1939 |
| 2,285,833 | Platt | June 9, 1942 |